US007997631B2

(12) United States Patent
Chen

(10) Patent No.: US 7,997,631 B2
(45) Date of Patent: Aug. 16, 2011

(54) DOUBLE-SIDED LOCK DEVICE AND ELECTRONIC DEVICE USING SAME

(75) Inventor: Wu-Yung Chen, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 790 days.

(21) Appl. No.: 11/941,970

(22) Filed: Nov. 19, 2007

(65) Prior Publication Data

US 2008/0121004 A1 May 29, 2008

(30) Foreign Application Priority Data

Nov. 24, 2006 (CN) .......................... 2006 1 0201141

(51) Int. Cl.
*E05C 17/56* (2006.01)
*G06F 1/16* (2006.01)

(52) U.S. Cl. ........ 292/251.5; 292/DIG. 11; 361/679.57; 361/679.58

(58) Field of Classification Search ............... 292/251.5, 292/129, 177, DIG. 11; 361/679.57, 679.58
See application file for complete search history.

(56) References Cited

U.S. PATENT DOCUMENTS 2,203,202 A * 6/1940 Kun ................................ 292/87
6,069,790 A 5/2000 Howell et al.
6,135,801 A 10/2000 Helot et al.
6,407,912 B1 6/2002 Chen et al.
6,517,129 B1 * 2/2003 Chien et al. ................ 292/251.5
6,698,853 B2 3/2004 Chen et al.
6,775,144 B2 8/2004 Gan et al.
6,937,465 B2 * 8/2005 Park ......................... 361/679.08
7,463,482 B2 * 12/2008 Chien et al. .............. 361/679.55
7,490,874 B2 * 2/2009 Chen ............................. 292/214
7,543,862 B2 * 6/2009 Lin ............................ 292/251.5

FOREIGN PATENT DOCUMENTS

CN 2530289 1/2003

* cited by examiner

*Primary Examiner* — Peter Cuomo
*Assistant Examiner* — Kristina R Fulton
(74) *Attorney, Agent, or Firm* — Frank R. Niranjan

(57) ABSTRACT

A lock device includes a first mounting unit, an operating member, a first and second actuating member, a magnet member and a latch member. The first mounting unit includes a main portion and two flanges bent from the first main portion. Each flange defines a notch. The operating member is configured for moving relative to the first mounting unit in a direction. The first and second actuating members are configured for respectively moving toward and proximate to one notch. The latch member is configured for being pivotable between a locking position and an unlocking position. In the locking position, the latch member is attracted by the magnet member and protrudes into one notch with engaging one flange. When the operating member moves in the direction, the latch member is pushed away from the first mounting member by means of one actuating member.

16 Claims, 11 Drawing Sheets

DOUBLE-SIDED LOCK DEVICE AND ELECTRONIC DEVICE USING SAME

BACKGROUND

1. Field of the Invention

The present invention generally relates to electronic devices, and particularly to a lock device for the electronic device.

2. Description of Related Art

A conventional portable computer includes a housing and a cover rotatably attached to the housing. Thus the cover can be flipped open and, on some models, the cover may be twisted about an axis perpendicular to the rotatable axis between the cover and the housing. The cover includes two flat opposite surfaces, one of the surfaces is a screen. The other surface may be metal or hard plastic.

When the cover is locked onto the housing, a locking device is also used in the portable computer cooperating with the hinge to complete the locking operation. However, the locking device usually includes a latch mounted on the screen side of the cover, and the latch engaging groove formed in a top side of the housing for engaging the latch. As such, the cover can only be locked to the housing when the screen side of the cover faces the housing. This limits the utility of the vertically rotatable cover of the portable computer.

Accordingly, a need exists for an improved lock device resolving the above problem in the industry.

SUMMARY

A lock device includes a first mounting unit, an operating member, a first and second actuating member, a magnet member and a latch member. The first mounting unit includes a main portion and two flanges bent from the first main portion. Each flange defines a notch. The operating member is configured for moving relative to the first mounting unit in a direction. The first and second actuating members are configured for respectively moving toward and proximate to one notch. The latch member is configured for being pivotable between a locking position and an unlocking position. In the locking position, the latch member is attracted by the magnet member and protrudes into one notch with engaging one flange. When the operating member moves in the direction, the latch member is pushed away from the first mounting member by means of one actuating member. An electronic device is also disclosed.

Other advantages and novel features of the present invention will become more apparent from the following detailed description of preferred embodiment when taken in conjunction with the accompanying drawings, in which:

DETAILED DESCRIPTION OF THE EMBODIMENT

Reference will now be made to the drawings to describe the preferred embodiments of the present lock device and the present electronic device, in detail.

Figure 1:
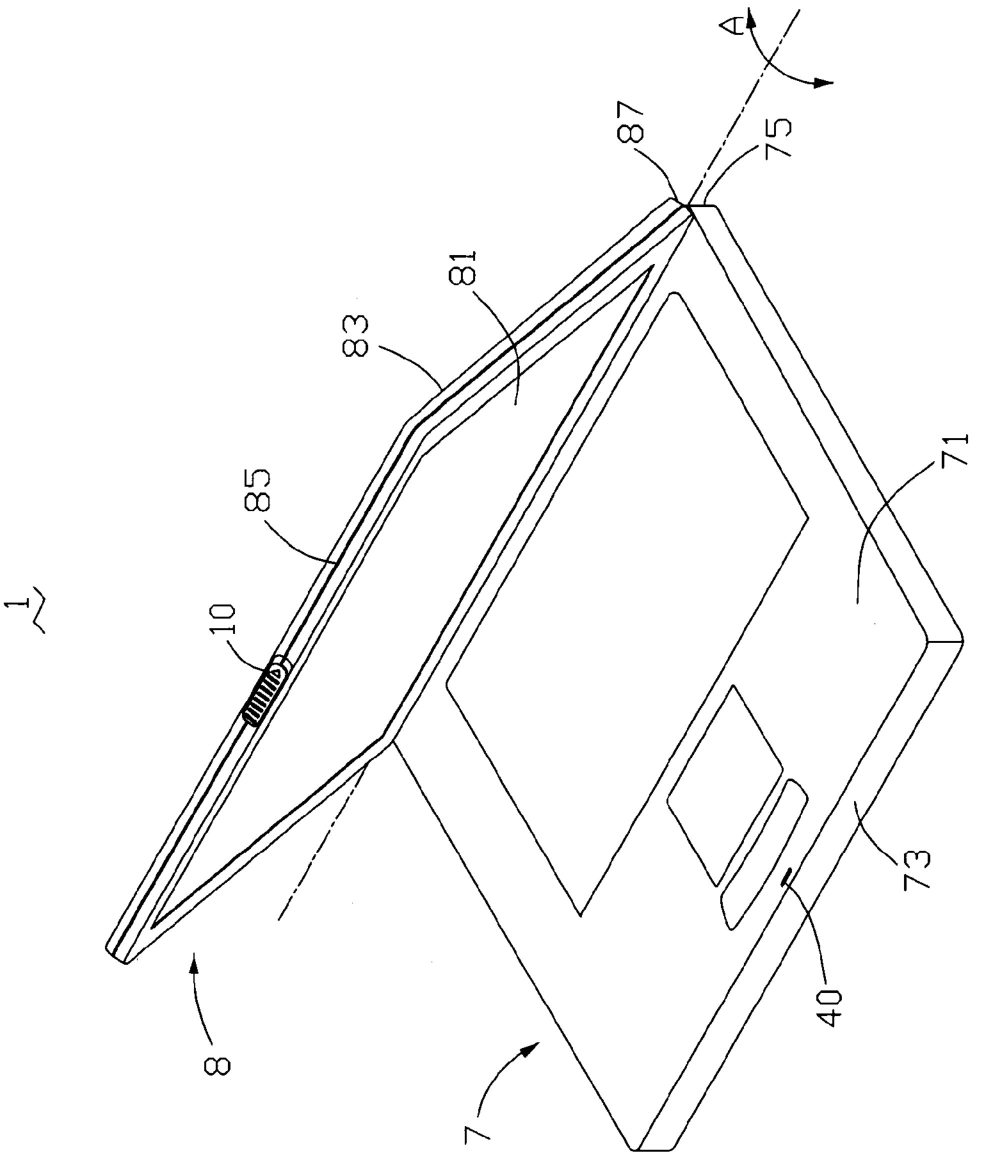
FIG. 1 is an isometric view of a portable computer in accordance with an exemplary embodiment, showing the portable computer including a housing, a cover, and a locking device, the cover rotating around a first axis.
Figure 2:
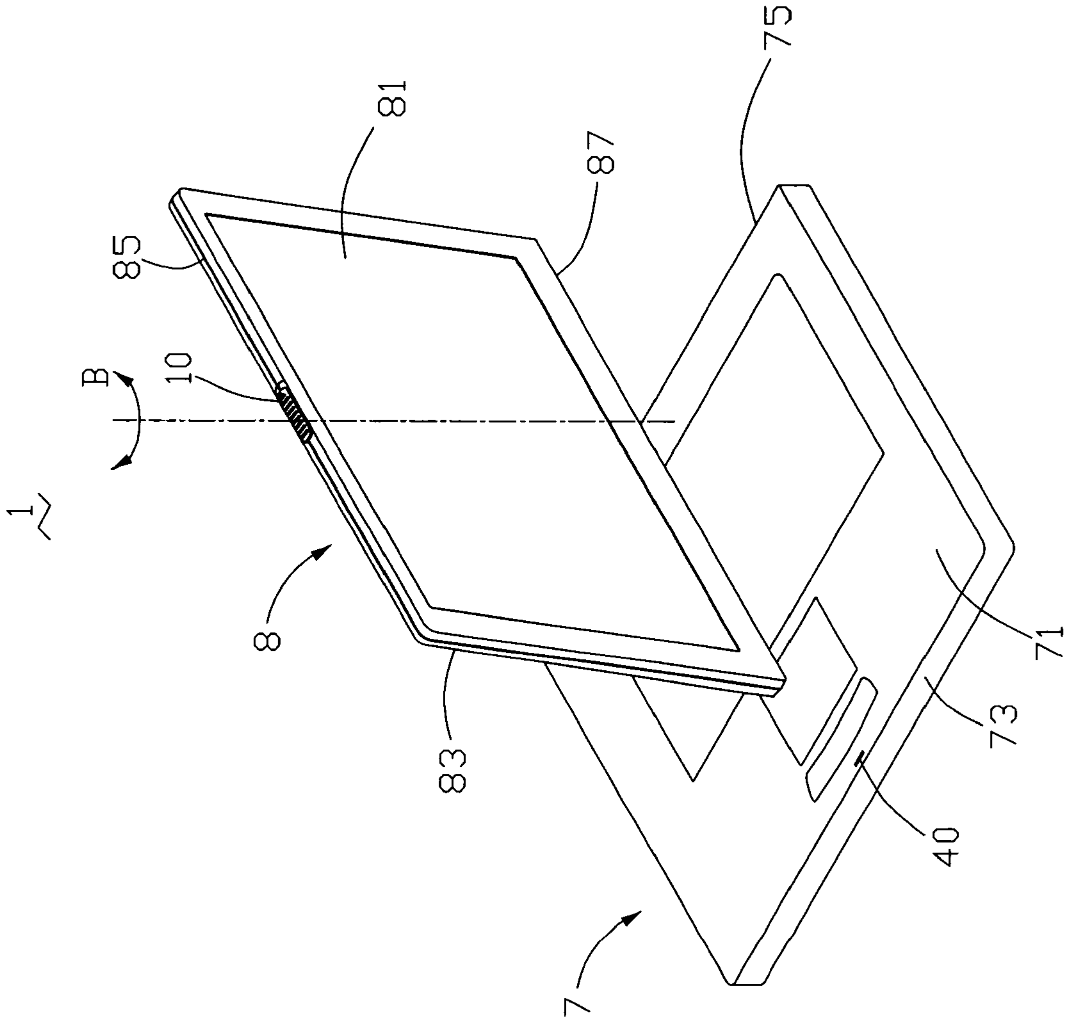
FIG. 2 is an isometric view of the portable computer in FIG. 1, showing the cover rotating around a second axis.

Referring to FIGS. 1 and 2, a preferred embodiment of a lock device shows an actuating unit 10 and a latch unit 40 incorporated into an electronic device, such as a portable computer 1. The portable computer 1 includes a housing 7, a cover 8, and a biaxial hinge (not labeled) pivotably connecting the housing 7 and the cover 8. The cover 8 has two opposite sides, e.g. a first side 81 and a second side 83, one of which a screen (not labeled) is mounted. The cover 8 is rotatable relative to the housing 7 around two perpendicular intersecting axes A and B. The cover 8 is rotatable around the axis A to cover over or flip opened from the housing 7, as shown in FIG. 1. The cover 8 is also rotatable around the axis B to selectively expose a first side 81 or a second side 83 of the cover 8 to users, as shown in FIG. 2.

The housing 7 includes an operating surface 71 facing the cover 8, a front edge 73, and a back edge 75. The front edge 73 and the back edge 75 are formed at opposite ends of the operating surface 71. The cover 8 includes the first side 81, the second side 83, a front edge 85, and a back edge 87. The front edge 85 and the back edge 87 are oppositely formed at two ends of the first and second sides 81, 83. The actuating unit 10 is attached to the cover 8 on the front edge 85. The latch unit 40 is attached to the housing 7 next to the front edge 73 and on the operating surface 71, and corresponds to the actuating unit 10. The biaxial hinge is mounted next to the back edge 87 of the cover 8 and the back edge 75 of the housing 7. The actuating unit 10 and the latch unit 40 attachable cooperate to lock the cover 8 to the housing 7 or detachably cooperate to release the cover 8 from the housing 7.

Figure 3:
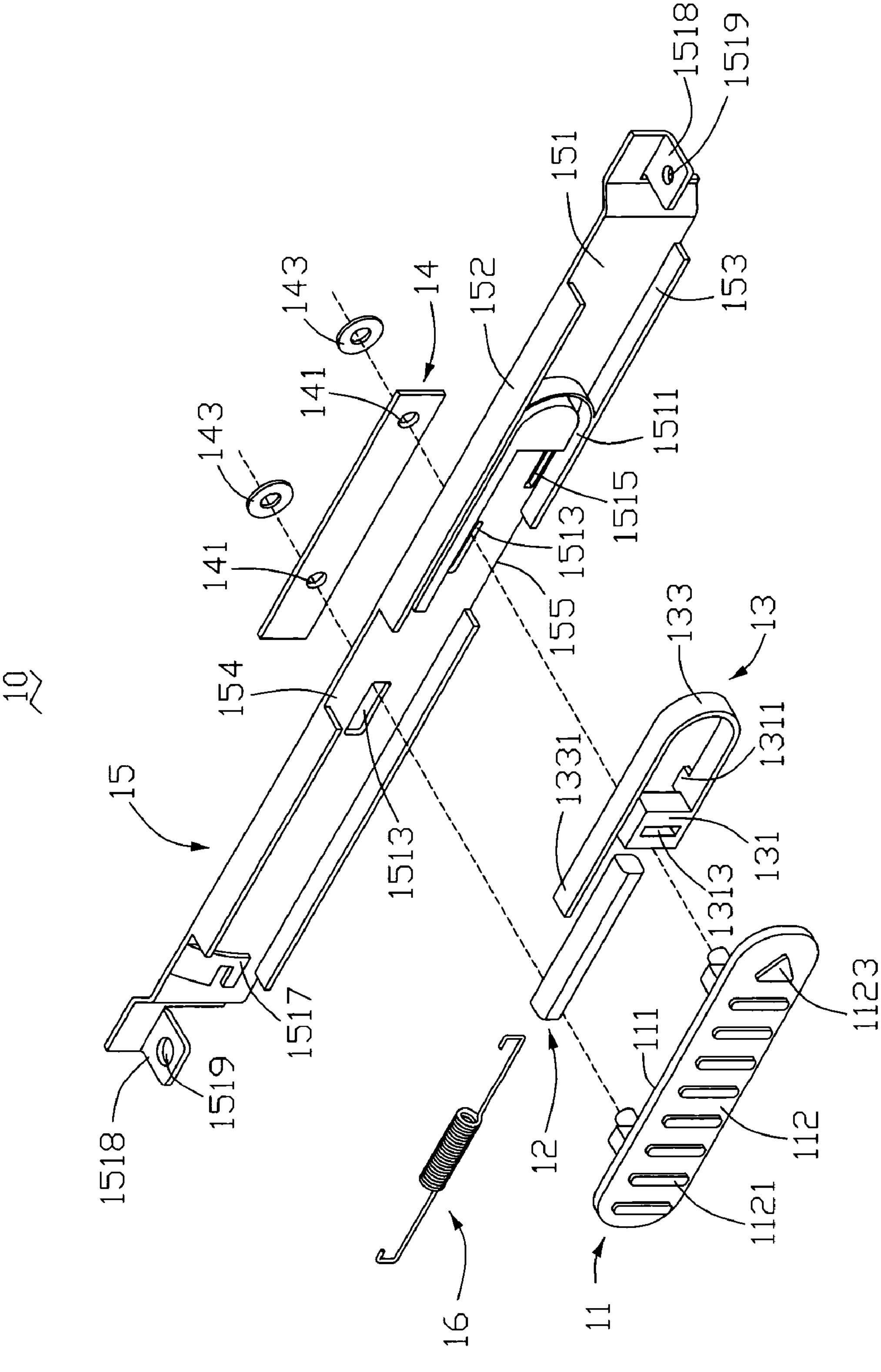
FIG. 3 is an exploded, isometric view of an activating unit of the locking device that is mounted on the cover.
Figure 4:
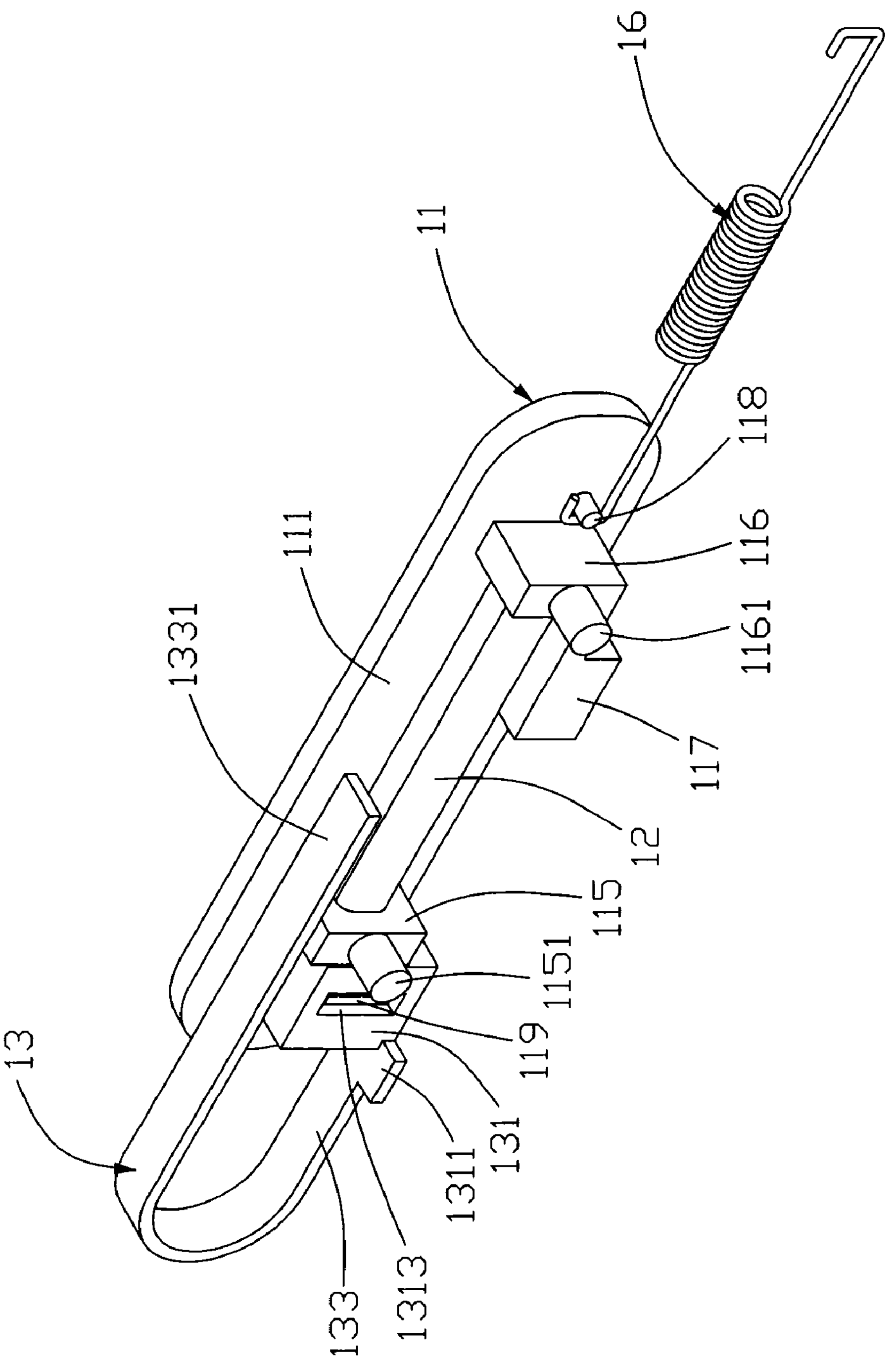
FIG. 4 is an assembled, isometric view of a part of the activating unit.

Referring to FIGS. 3 and 4, the actuating unit 10 includes an operating member 11, a magnetic member 12, a flexible member 13, a positioning plate 14, a first mounting member 15, and a first tension spring 16.

The operating member 11 is mounted on the front edge 85 of the cover 8. The operating member 11 includes an inner surface 111 and an outer surface 112. The inner surface 111 is configured to mount the first mounting member 15 thereon and to hold the magnetic member 12 and the flexible member 13 between the operating member 11 and the first mounting member 15. The outer surface 112 is configured for an external force to drive the operating member 11 to move in a direction. A pair of blocks 115, 116 protrudes from the inner surface 111 of the operating member 11 for sandwiching the magnetic member 12. A pair of protruding studs 1151, 1161 horizontally extends from the blocks 115, 116, respectively. An activating projection 117 perpendicularly extends from the inner surface 111 at a side of the magnetic member 12. A pin 118 and a patch 119 are respectively formed on the inner surface 111. The pin 118 and the magnetic member 12 are formed next to two opposite sides of the block 116, and the patch 119 and the magnetic member 12 are formed next to two opposite sides of the block 115. The pin 118 is configured to be hooked by an end of the first tension spring 16, and the patch 119 is used to stabilize an end of the flexible member 13. A plurality of ridges 1121, substantially perpendicular to the direction of movement, is evenly formed on the outer surface 112 of the operating member 11. When external force is applied to the operating member 11, the ridges 1121 increases the frictional force between the operating member 11 and the external force applier. An indicator 1123, which indicates the direction of movement of the operating member 11, is formed at a distal end of the outer surface 112, next to the ridges 1121.

The magnetic member 12 is mounted to the inner surface 111 of the operating member 11 to provide a magnetic force on the latch unit 40, so as to attract the latch unit 40 to engage with the actuating unit 10.

Figure 5:
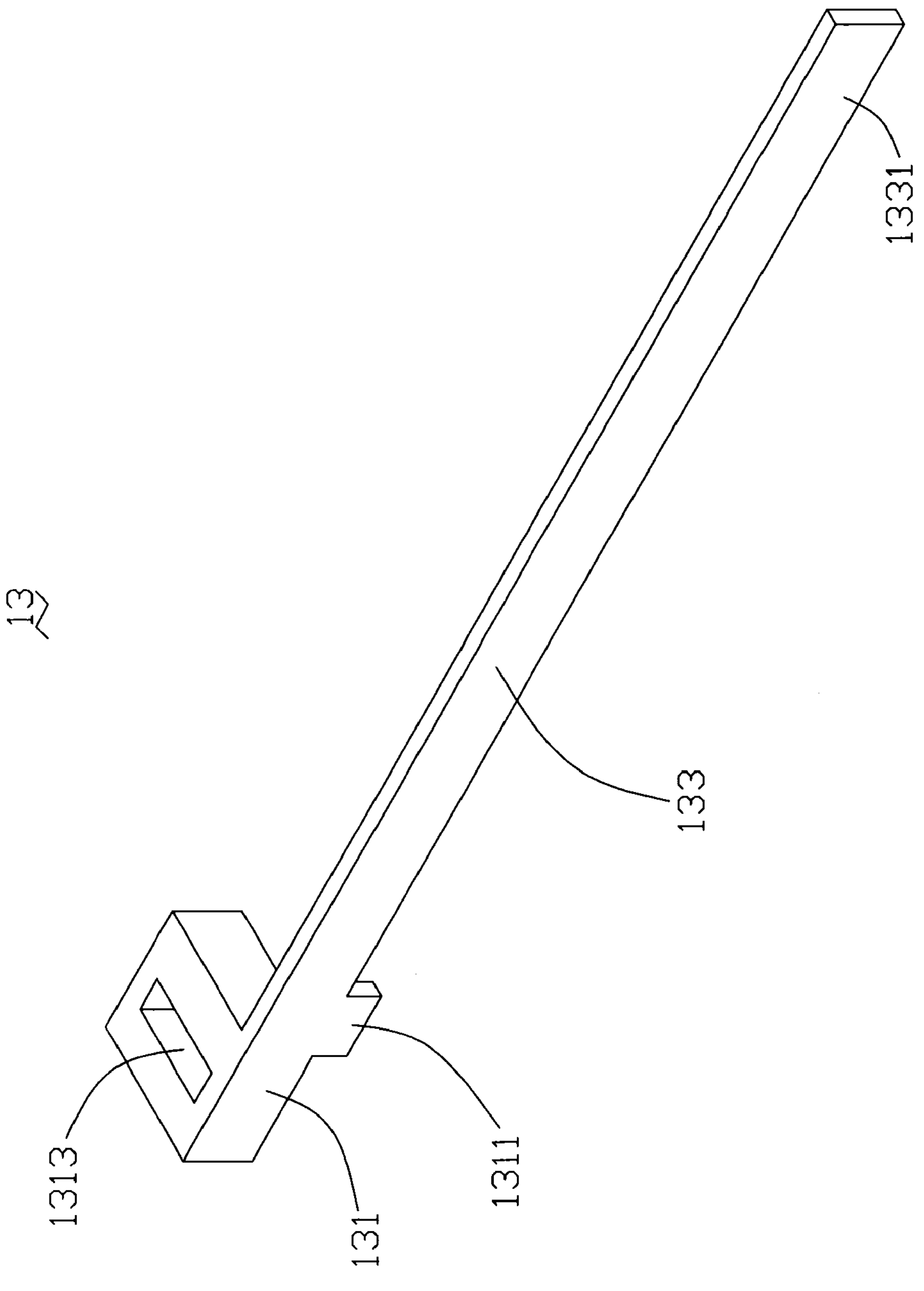
FIG. 5 is an enlarged, isometric view of a flexible member of the activating unit.
Figure 6:
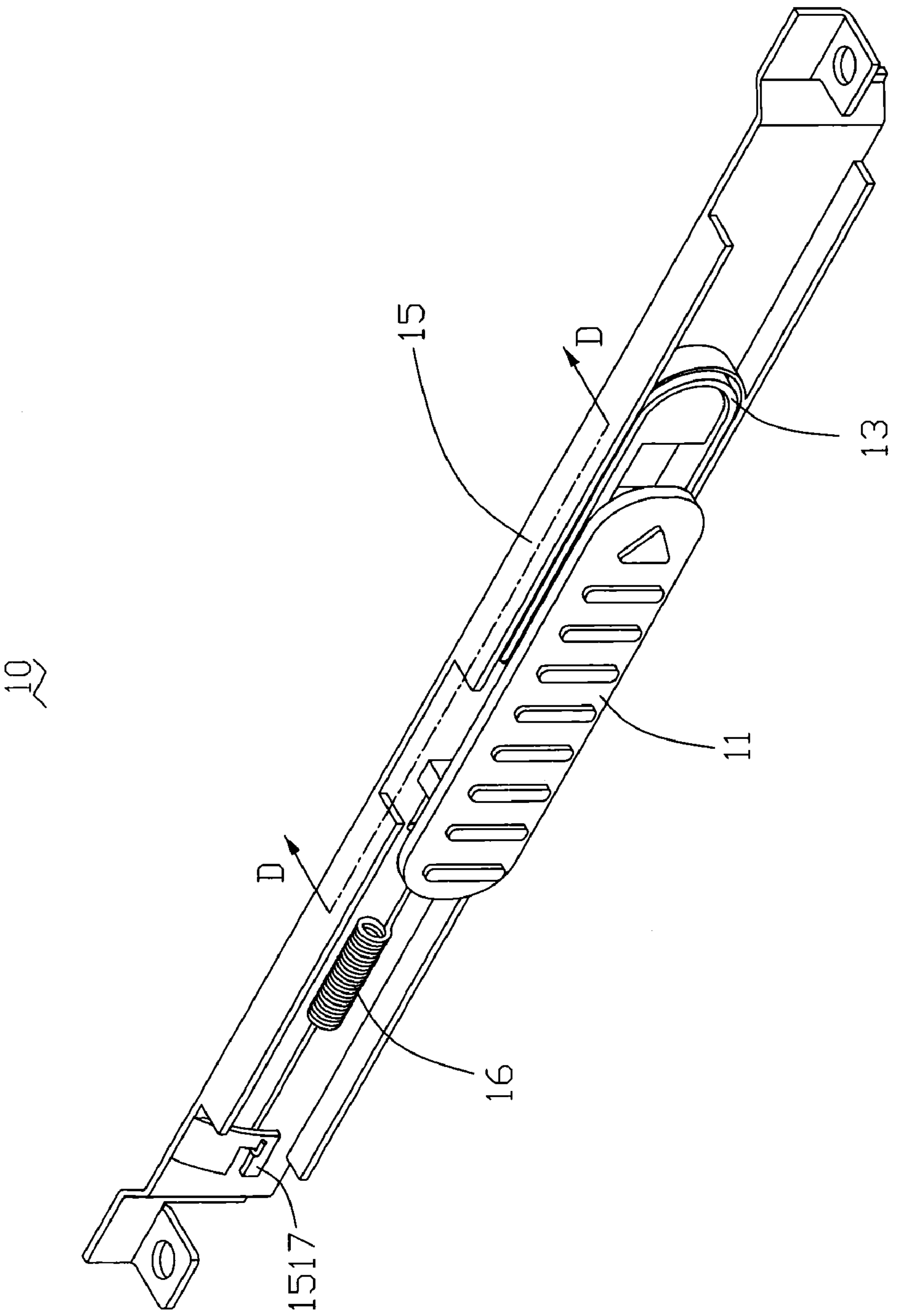
FIG. 6 is an assembled, isometric view of the activating unit.
Figure 7:
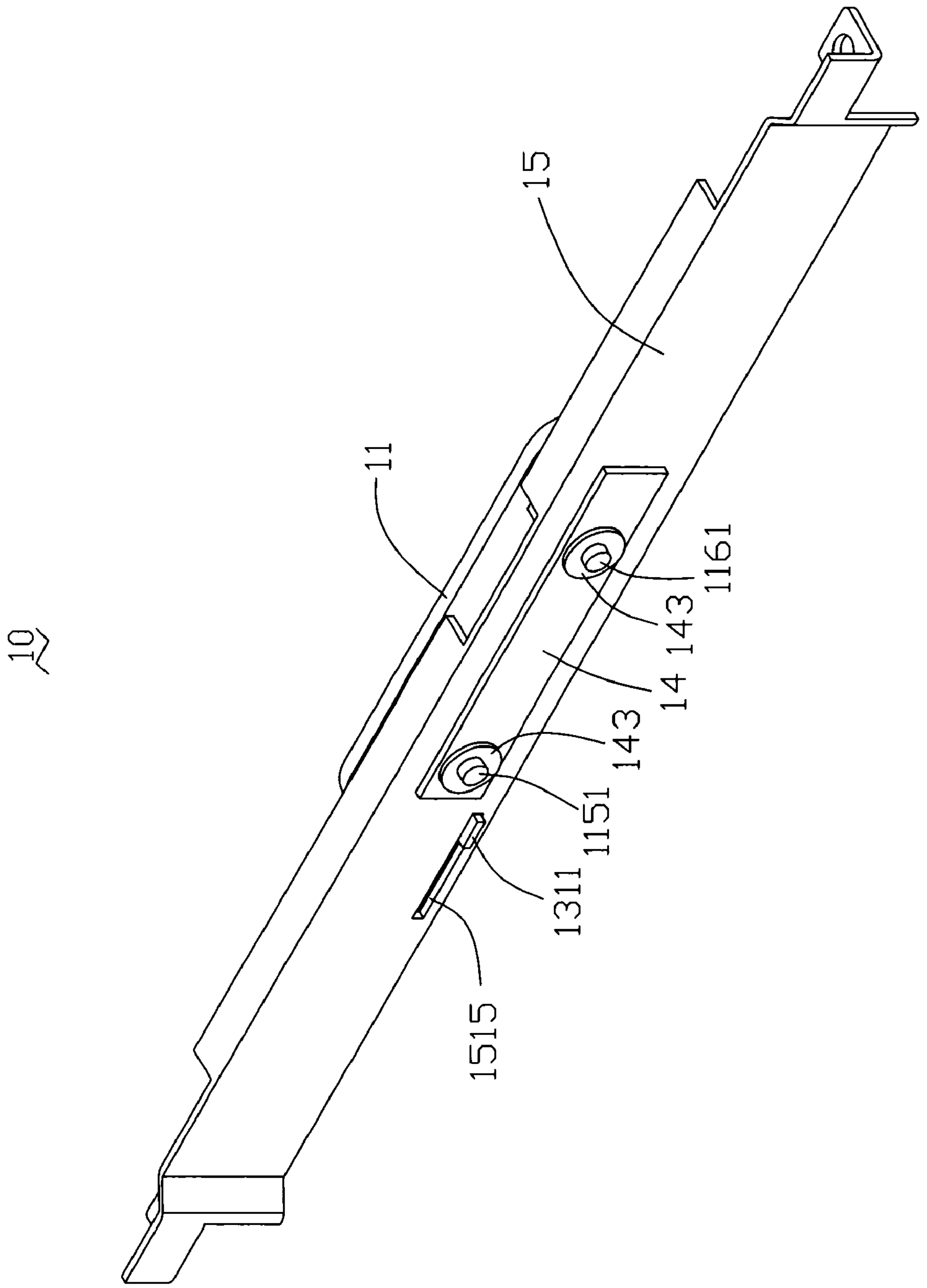
FIG. 7 is similar to FIG. 6, but viewed from another aspect.

The malleable member 13, as shown straightened out in FIG. 5, includes a head 131 and a malleable tail 133 extending from the head 131. The head 131 defines a slot 1313 for allowing the patch 119 of the operating member 11 to protrude therefrom, thus being mounted to the operating member 11. The malleable tail 133 is preferably an elongated strip. The malleable tail 133 can be bent into different shapes under different external forces. A tab 1311 horizontally extends from an end of the malleable tail 133 that is adjacent to the head 131.

The positioning plate 14 is preferably rectangular in shape, and defines a pair of through holes 141. The through holes 141 corresponds to the protruding studs 1151, 1161, and are configured to substantially allow the protruding studs 1151, 1161 to protrude therefrom. A pair of rings 143 is provided on ends of the protruding studs 1151, 1161 to secure the first mounting member 15 to the operating member 11 together with the positioning plate 14.

The first mounting member 15 includes an elongated main portion 151, and further includes a first flange 152, and a second flange 153 respectively bent from two elongated edges of the main portion 151. The first flange 152 and the second flange 153 are parallely distributed along the direction of movement. A first notch 154 and a second notch 155 are respectively defined in the first flange 152 and the second flange 153. A first distance between the first notch 154 and the axis B is equal to a second distance between the second notch 155 and the axis B.

A U-shaped guide rail 1511 is formed on the main portion 151 and configured for accommodating the malleable tail 133 of the malleable member 13 therein. The U-shaped guide rail 1511 extends from a vicinity of the first notch 154 to a vicinity of the second notch 155. A pair of first restriction slots 1513 and a second restriction slot 1515 is defined in the main portion 151. The first restriction slots 1513 are used to allow the protruding studs 1151,1161 to protrude therefrom and guide the movement of the operating member 11 along the direction of movement within a length of the first restriction slots 1513. The second restriction slot 1515 is adjacent to the second notch 155 to receive the tab 1311 therein to guide the movement of the malleable tail 133. A catch 1517 is formed at one end of the main portion 151 for fastening another end of the first tension spring 16. A pair of mounting tabs 1518, each defining a mounting hole 1519, is respectively formed at two distal ends of the main portion 151 and configured for securing the first mounting member 15 and other components secured thereto to the cover 8 with fasteners (not shown).

Referring to FIGS. 3, 4, 6 and 7, an assembly procedure of the actuating unit 10 will be described in detail. The magnetic member 12 is positioned between and sandwiched by the blocks 115, 116. The head 131 of the flexible member 13 is coupled to the patch 119 of the operating member 11. That is, the patch 119 is received in the slot 1313 in the head 131. One end of the first tension spring 16 is clasped to the pin 118 of the operating member 11. After the above, the assembly is placed into the first mounting member 15. The flexible tail 133 of the flexible member 13 is bent conforming to the shape of the guide rail 1511 of the main portion 151 of the first mounting member 15. A free end 1331 of the flexible tail 133 is in a vicinity of the first notch 154. The protruding studs 1151, 1161 and the tab 1311 are respectively inserted into the first restriction slots 1513 and the second restriction slot 1515. The positioning plate 14 and the rings 143 are secured to the protruding studs 1151, 1161 to make the operating member 11 slideably mounted to the first mounting member 15. Finally, the other end of the first tension spring 16 is engaged with the catch 1517 of the first mounting member 15. When the operating member 11 is moved along the direction of movement, i.e. the direction that the indicator is pointing, the protruding studs 1151, 1161 and the head 131 of the flexible member 13 move together with the operating member 11 towards the direction of movement, while because of being restricted by the U shape of the guide rail 1511, the flexible tail 133 of the flexible member 13 moves along the guide rail 1511 and a free end 1331 of the flexible tail 133 moves towards a reverse direction to the direction of movement.

Figure 8:
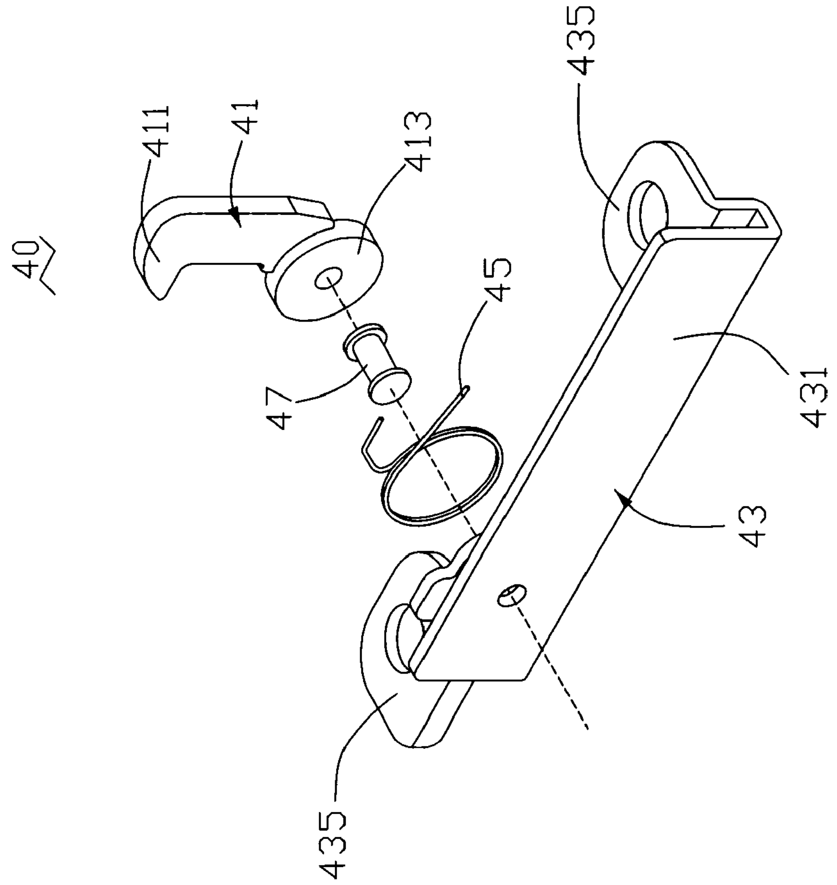
FIG. 8 is an exploded, isometric view of a latch unit of the locking device that is mounted on the housing.
Figure 9:
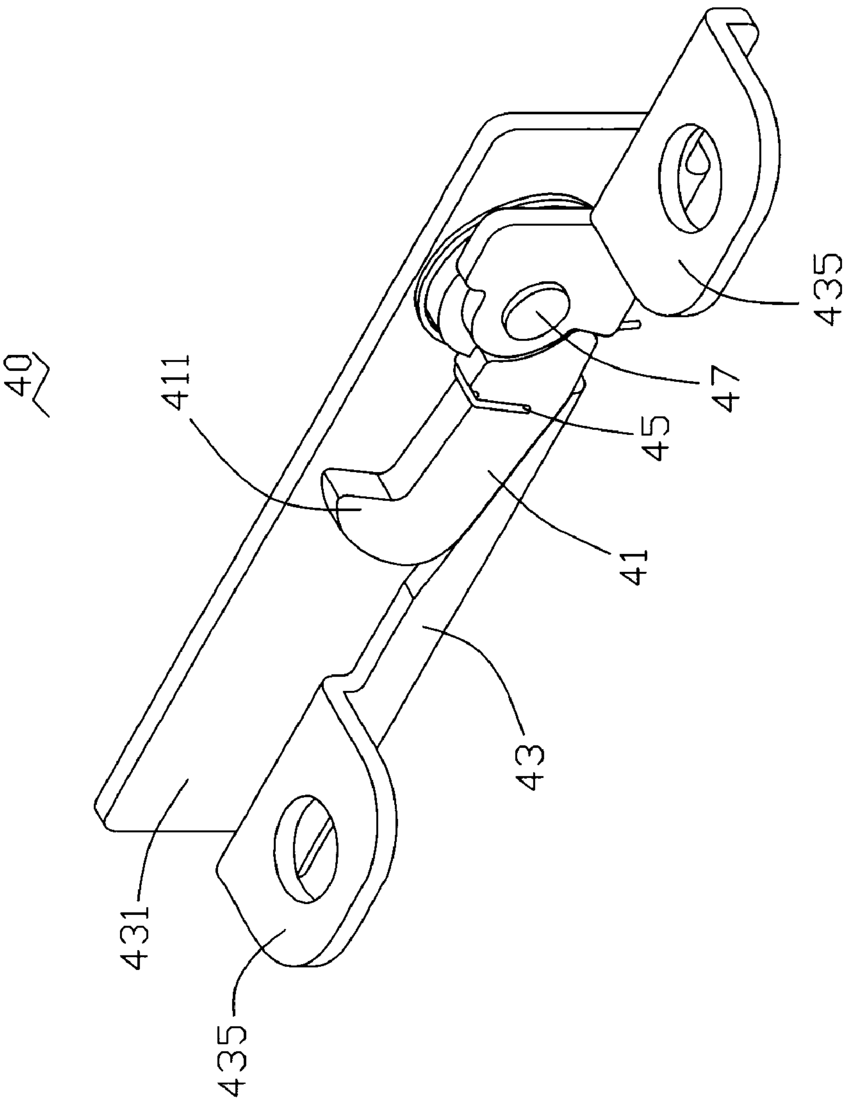
FIG. 9 is an assembled, isometric view of the latch unit.

Referring to FIGS. 8 and 9, the latch unit 40 includes a latch member 41, a second mounting member 43, a second torsion spring 45 and a shaft 47. The second mounting member 43 includes an upright base wall 431 and a pair of fastening plates 435 horizontally extending from two opposite ends of the base wall 431. The second mounting member 43 is attached to one of the operating surface 71 and the front edge 73 of the housing 7 and is adjacent to the other one by means of the fastening plates 435. The latch member 41 is pivotally mounted to the base wall 431 by means of the shaft 47, so as to be pivotable about a horizontal axis transverse to the base wall 431 between an upright locking position (shown in FIG. 8) and a horizontal unlocking position (shown in FIG. 9). The second torsion spring 45 is sandwiched between the second mounting member 43 and the latch member 41, and is configured for biasing the latch member 41 to the unlocking position. The latch member 41 is made of a magnetic material, and has a mounting portion 413 rotatably mounted on the shaft 47, and a hooked locking portion 411 extending from the mounting portion 413. In the unlocked position, the hooked portion 411, of the latch member 41, is retracted into the housing 7. In the locked position, the hooked portion 411, of the latch member 41, projects upwardly relative to the operating surface 71 of the housing 7.

In use, when the cover 8 of the portable computer 1 is being closed, with the first side 81 or the second side 83 of the cover 8 facing the operating surface 71, the actuating unit 10 mounted on the cover 8 moves closer to the latch unit 40 on the housing 7. At a certain distance, the latch member 41 of the latch unit 40 is attracted by the magnetic member 12 of the actuating unit 10, and is moved pivotally to be in contact with the actuating unit 10 depending on the biasing action of the second torsion spring 45. The hooked locking portion 411 of the latch member 41 thus extends into an adjacent one of the first and second notches 154, 155, and hooks to the first and second flanges 152,153. Thereby, the cover 8 is locked on the housing 7.

Figure 10:
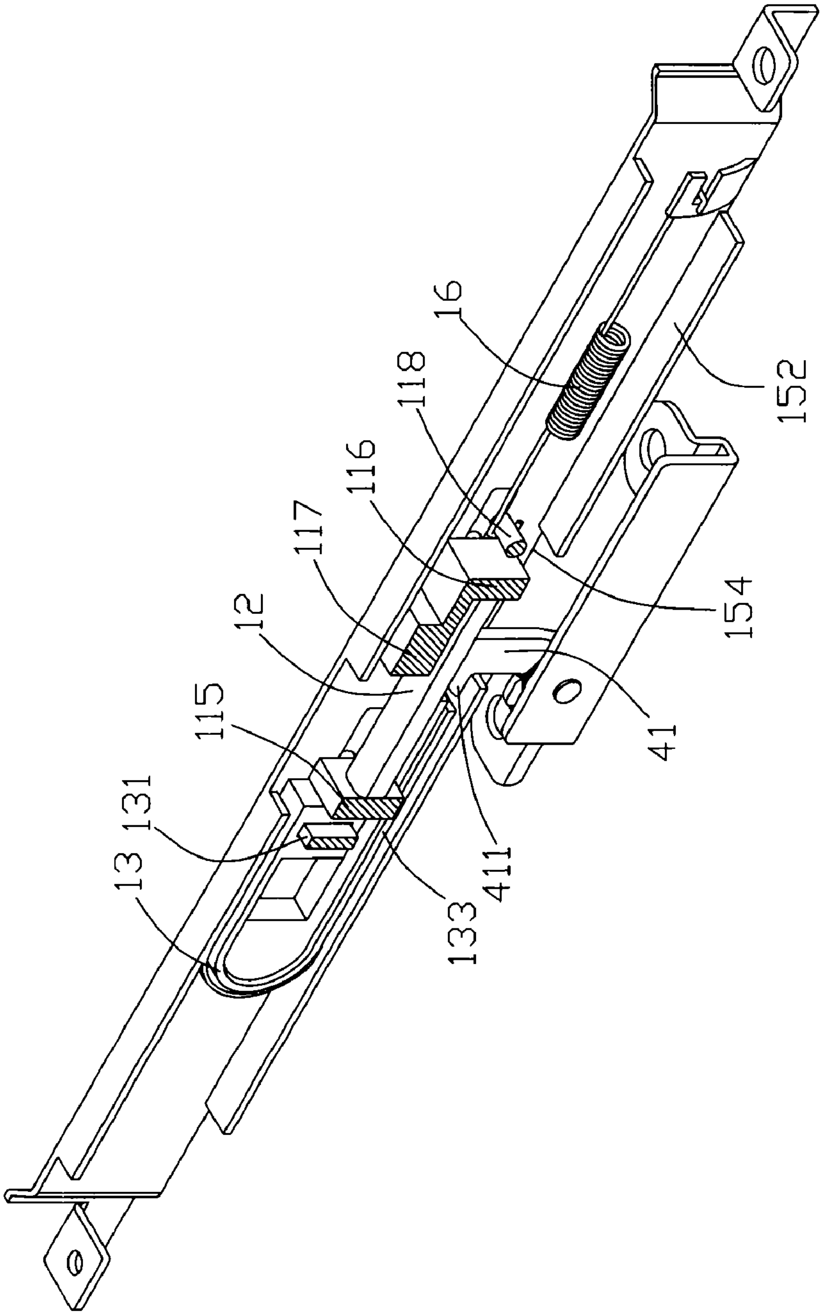
FIG. 10 is an isometric view of the activating unit and the latch unit coupled together, the latch unit engaging with the activating unit from a first side.
Figure 11:
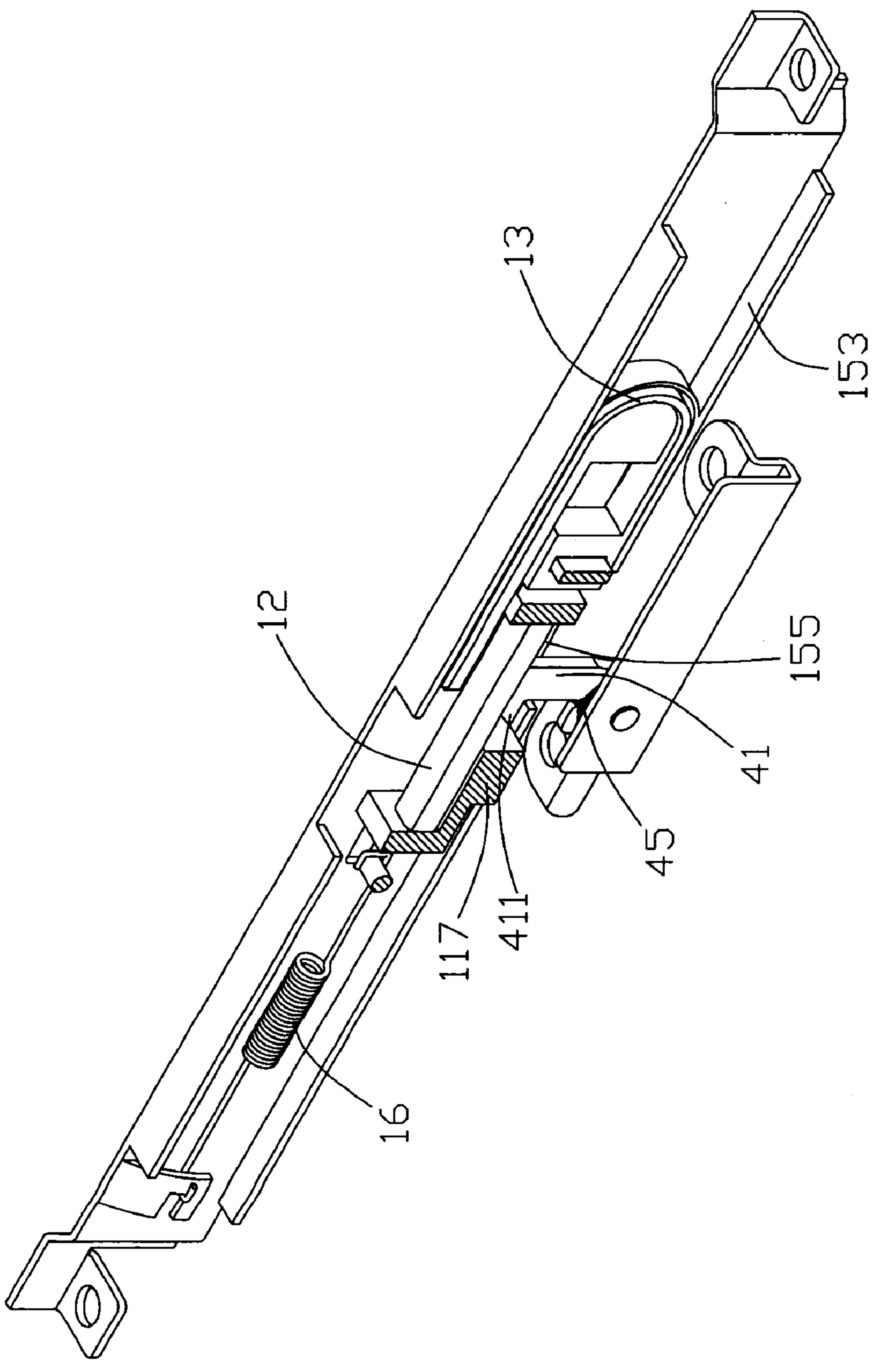
FIG. 11 is an isometric view of the activating unit and the latch unit coupled together, the latch unit engaging with the activating unit from a second side.

When the cover 8 is locked on the housing 7 with the first side 81 and the first flange 152 of the first mounting unit 15 facing the operating surface 71, referring to FIG. 10, the hooked locking portion 411 of the latch member 41 is received in the first notch 154 and hooks the first flange 152. When the cover 8 is locked on the housing 7 with the second side 83 and the second flange 153 of the first mounting unit 15 facing the operating surface 71, referring to FIG. 11, the hooked locking portion 411 of the latch member 41 is received in the second notch 155 and hooks the second flange 153.

To unlock the cover 8 from the housing 7, the operating member 11 is operated manually in the direction of movement indicated by the indicator 1123. At this time, because the activating projection 117 and the head 131 of the flexible member 13 are formed or fastened to the operating member 11, both of the activating projection 117 and the head 131 of the flexible member 13 are moved together with the operating member 41 in the direction of movement. Following the movement of the head 131 of the flexible member 13, the free end 1331 of the flexible tail 133 of the flexible member 13 moves in the direction opposite to the direction of movement due to the U shape of the guide rail 1511. Therefore, following the movement of the operating member 11, the activating projection 117 moves toward and proximate to the second notch 155, and the free end 1331 of the flexible tail 133 moves toward and proximate to the first notch 154.

Whenever the hooked locking portion 411 of the latch member 41 hooks of the first flange 152 and the second flange 153, the hooked locking portion 411 is pushed away therefrom by the activating projection 117 or the free end 1331 of the flexible tail 133. Then, the latch member 41 pivots back to the unlocking position by virtue of the biasing action of the second torsion spring 45. Therefore, the cover 8 is unlocked from the housing 7.

It has thus been shown that, with the use of the above described lock device, the cover 8 can be locked to the housing 7 with either of the first and second sides 81, 83 facing downwardly. By simply operating the operating member 11 manually in the direction indicated by the indicator 1123, the latch member 41 is moved by either of the activating projection 117 and the free end 1331 of the flexible member 13 for disengaging from the corresponding flange 152, 153, thereby unlocking the cover 8 from the housing 7.

The foregoing description of the exemplary embodiments of the invention has been presented only for the purposes of illustration and description and is not intended to be exhaustive or to limit the invention to the precise forms disclosed. Many modifications and variations are possible in light of the above teaching. The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. An electronic device comprising: a first portion;

a second portion including two opposite sides that are capable of selectively covering the first portion; a locking device configured for locking the second portion to the first portion, the locking device comprising: a first mounting unit attached to the second portion, the first mounting unit defining a pair of notches in two opposite sides;

an operating member movably mounted to the first mounting unit, the operating member configured for being applied an external force to move relative to the first mounting unit in a direction; a first actuating member attached to the operating member and configured for moving together with the operating member in the direction so as to move toward and proximate to the first notch; a second actuating member attached to the operating member and configured for moving together with the operating member in a direction opposite to the direction of movement so as to move toward and proximate to the second notch; a magnet member received in the second portion; a second mounting member received in the first portion and corresponding to the first mounting member; and a latch member pivotably mounted on the second mounting member, the latch member configured for being pivotable between a locking position at which the latch member protrude out the first portion and an unlocking position at which the latch member is retracted into the first portion; wherein, in the locking position, the latch member is attracted by the magnet member and protrudes into one of the first and second notches, when the operating member moves in the direction, the latch member is pushed to pivot out of the one of the first and second notches by means of one of the first and second actuating member, thus releasing the second portion from the first portion; the locking device comprises a flexible member, the flexible member includes a head and a flexible tail extending from the head, an end of the flexible tail away from the head is used as the second actuating member, the head is mounted on the operating member, when the operating member is moved along the direction of movement, the head of the flexible member moves together with the operating member towards the direction of movement, the end of the flexible tail away from the head moves towards a reverse direction to the direction of movement, wherein the operating member forms a patch at an inner surface, and the head of the flexible member defines a slot configured for receiving the patch therein.

2. The electronic device as claimed in claim 1, wherein the second portion is rotatable relative to the first portion around a first axis and a second axis perpendicular to the first axis, the second portion is rotatable relative to the first portion around the first axis to cover over or flip opened from the first portion.

3. The electronic device as claimed in claim 2, wherein the two notches have an equal distance to the second axis.

4. The electronic device as claimed in claim 1, wherein the first mounting member including a main body and a first and a second flange bend from two opposite edges of the main body, the first notch and the second notch are respectively defined in the first flange and the second flange, the latch member engages, corresponding, one of the first and second flanges when in the locking position.

5. The electronic device as claimed in claim 1, wherein the first actuating member is an actuating projection extending from an inner surface of the operating member.

6. The electronic device as claimed in claim 1, wherein the first mounting member forms a guide rail for accommodating the flexible tail therein, when the head of the flexible member moves together with the operating member towards the direction of movement, the flexible tail moves along the guide rail and is restricted by the guide rail.

7. The electronic device as claimed in claim 1, wherein the locking device further comprises a first torsion spring for biasing the latch member to the unlocking position.

8. The electronic device as claimed in claim 1, wherein the guide rail extends from a vicinity of the first notch to a vicinity of the second notch.

9. The electronic device as claimed in claim 1, wherein the guide rail is U-shaped.

10. The electronic device as claimed in claim 1, further comprising a second torsion spring, the second torsion spring including two ends, one end being mounted on the first mounting unit, and the other end being mounted on the operating member.

11. An electronic device comprising: a first portion; a second portion including two opposite sides that are capable of selectively covering the first portion; a locking device configured for locking the second portion to the first portion, the locking device comprising: a first mounting unit attached to the second portion, the first mounting unit defining a first notch in a first side; an operating member movably mounted to the first mounting unit, the operating member configured for being applied an external force to move relative to the first mounting unit in a direction; a first actuating member attached to the operating member and configured for moving together with the operating member in a direction opposite to the direction of movement so as to move toward and proximate to the first notch;

a second mounting member received in the first portion and corresponding to the first mounting member; and a latch member pivotably mounted on the second mounting member, the latch member configured for being pivotable between a locking position at which the latch member protrude out the first portion and an unlocking position at which the latch member is retracted into the first portion; wherein, in the locking position, the latch member protrudes into the first notch, when the operating member moves in the direction, the latch member is pushed to pivot out of the first notch by means of the first actuating member, thus releasing the second portion from the first portion; the locking device comprises a flexible member, the flexible member includes a head and a flexible tail extending from the head, an end of the flexible tail away from the head is used as the first actuating member, when the operating member is moved along the direction of movement, the head of the flexible member moves together with the operating member towards the direction of movement, the end of the flexible tail away from the head moves towards a reverse direction to the direction of movement, further comprising a second actuating member, wherein the first mounting unit further defines a second notch in a second side opposite to the first side; the second actuating member is attached to the operating member and is configured for moving together with the operating member in the direction so as to move toward and proximate to the second notch; in the locking position, the latch member protrudes into the second notch; when the operating member moves in the direction, the latch member is pushed to pivot out of the second notch by means of the second actuating member, thus releasing the second portion from the first portion, further comprising a magnet member received in the second portion, wherein the latch member is attracted by the magnet member and protrudes into one of the first and the second notches, wherein the operating member forms a patch at an inner surface, and the head of the flexible member defines a slot configured for receiving the patch therein.

12. The electronic device as claimed in claim 11, wherein the second actuating member is an actuating projection formed on the operating member.

13. The electronic device as claimed in claim 11, wherein the main portion of the first mounting unit forms a guide rail configured for accommodating the flexible tail therein, when the head of the flexible member moves together with the operating member towards the direction of movement, the flexible tail moves along the guide rail and is restricted by the guide rail.

14. The electronic device as claimed in claim 13, wherein the guide rail is U-shaped.

15. The electronic device as claimed in claim 11, further comprising a first torsion spring, the first torsion spring including two ends, one end being mounted on the first mounting unit, and the other end being mounted on the operating member.

16. The electronic device as claimed in claim 11, further comprising a second mounting member and a shaft, the latch member being pivotably mounted to the second mounting member by the shaft; and a second torsion spring for biasing the latch member to the unlocking position.

* * * * *